US011388615B2

(12) United States Patent
Yanover et al.

(10) Patent No.: US 11,388,615 B2
(45) Date of Patent: Jul. 12, 2022

(54) INTERACTION BETWEEN RADIO CONTROLLER PLATFORM AND THIRD PARTY APPLICATIONS

(71) Applicant: Cisco Technology, Inc., San Jose, CA (US)

(72) Inventors: Vladimir Yanover, Kfar-Saba (IL); Alon Ben Ami, Gedera (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 191 days.

(21) Appl. No.: 16/540,250

(22) Filed: Aug. 14, 2019

(65) Prior Publication Data

US 2021/0051490 A1 Feb. 18, 2021

(51) Int. Cl.
*H04W 24/02* (2009.01)
(52) U.S. Cl.
CPC .................................. *H04W 24/02* (2013.01)
(58) Field of Classification Search
None
See application file for complete search history.

(56) References Cited

U.S. PATENT DOCUMENTS

| 8,191,107 | B1 * | 5/2012 | Frattura | H04L 43/0811 |
| | | | | 726/1 |
| 8,903,373 | B1 | 12/2014 | Nuss et al. | |
| 9,565,576 | B2 * | 2/2017 | Tofighbakhsh | H04W 48/18 |
| 10,143,002 | B2 | 11/2018 | Madan et al. | |
| 10,200,884 | B2 * | 2/2019 | Tan | H04W 24/02 |
| 10,231,134 | B1 * | 3/2019 | Brisebois | H04L 43/087 |
| 10,425,829 | B1 * | 9/2019 | Cui | H04W 16/02 |
| 10,959,137 | B2 * | 3/2021 | Yanover | H04W 36/0033 |
| 2006/0133331 | A1 | 6/2006 | Jhamnani et al. | |
| 2007/0094322 | A1 | 4/2007 | Peev et al. | |
| 2009/0285099 | A1 | 11/2009 | Kahn et al. | |

(Continued)

FOREIGN PATENT DOCUMENTS

EP 1395068 A1 3/2004

OTHER PUBLICATIONS

Keeney, John et al., "Non Real-Time RAN Intelligent Conlroller (RIC non-RT)", O-RAN Software Community, Project Proposal, For inclusion from Release A, downloaded Jul. 24, 2019, 7 pages.

(Continued)

*Primary Examiner* — Nicholas Sloms
(74) *Attorney, Agent, or Firm* — Edell, Shapiro & Finnan, LLC

(57) ABSTRACT

Systems and methods are provided by which a radio controller, also called a radio intelligence controller (RIC), is configured as a platform that hosts one or more third party applications. The radio controller platform provides the applications with access to radio access network (RAN) information and a command interface. An application programming interface is defined between the applications and the radio controller. The radio controller collects information from the RAN node and makes that information available to the applications. The applications also provide input information to the radio controller, such as in the form of a commands or a radio controller policy. The radio controller policy rules from the applications are executed by the radio controller or direct the radio controller to query one of the applications for an instruction.

23 Claims, 7 Drawing Sheets

(56) References Cited

U.S. PATENT DOCUMENTS

| | | |
|---|---|---|
| 2011/0096732 A1 | 4/2011 | Rashid et al. |
| 2013/0155849 A1 | 6/2013 | Koodli et al. |
| 2013/0155965 A1 | 6/2013 | Koodli |
| 2015/0138952 A1* | 5/2015 | Tamura .................. H04L 45/58 370/225 |
| 2015/0208335 A1 | 7/2015 | Vrbaski et al. |
| 2015/0215949 A1* | 7/2015 | Gormley ................ H04L 5/006 370/252 |
| 2015/0334754 A1 | 11/2015 | Lei et al. |
| 2016/0330748 A1* | 11/2016 | Bindrim .................. H04L 63/20 |
| 2017/0064031 A1* | 3/2017 | Sunay ................ H04W 72/082 |
| 2017/0230240 A1* | 8/2017 | Kim ................... H04L 41/0823 |
| 2017/0311191 A1* | 10/2017 | Khawer ............. H04L 27/0006 |
| 2017/0374568 A1* | 12/2017 | Heath ...................... H04W 8/18 |
| 2018/0351652 A1* | 12/2018 | Ashrafi ................... H04L 41/08 |
| 2019/0059027 A1 | 2/2019 | Yang et al. |
| 2019/0098624 A1 | 3/2019 | Vaidya et al. |
| 2019/0149434 A1* | 5/2019 | Chou ................... H04L 41/082 370/254 |
| 2019/0182211 A1 | 6/2019 | Yang et al. |
| 2019/0254013 A1* | 8/2019 | Chang ....................... H04L 5/00 |
| 2019/0296991 A1* | 9/2019 | Burnette ............... H04W 24/10 |
| 2019/0317846 A1* | 10/2019 | Liu ............................ G06F 8/60 |
| 2020/0029199 A1 | 1/2020 | Sen et al. |
| 2020/0053531 A1 | 2/2020 | Myhre et al. |
| 2020/0092733 A1 | 3/2020 | Myhre et al. |
| 2020/0106536 A1 | 4/2020 | Bedekar et al. |
| 2020/0287785 A1* | 9/2020 | Barabell ................. H04L 41/12 |
| 2020/0313736 A1* | 10/2020 | Jana ..................... H04B 7/0617 |

OTHER PUBLICATIONS

Yuan, Yannan et al., "From C-RAN to O-RAN", China Mobile Research Institute, Jun. 21, 2018, 8 pages.

Chih-Lin et al., "O-RAN: Towards an Open and Smart RAN", WhitePaper, Oct. 2018, 19 pages.

Nokia, "Open Edge Cloud", Nokia 2015, downloaded Jul. 24, 2019, 13 pages.

Cisco, "Cisco SONFlex", Taking your RAN automation to the next level, WhitePaper, C11-741043-00, Aug. 2018, 7 pages.

Klaine, Paulo Valente et al., "A Survey of Machine Learning Techniques Applied to Self Organizing Cellular Networks", IEEE Communications Surveys & Tutorials, Jul. 2017, 41 pages.

Martiny, Elaus et al., NGMN Alliance, "5G Network and Service Management including Orchestration", Version 3.14.0, Mar. 12, 2019, 53 pages.

\* cited by examiner

500

```
┌─────────────────────────────────────────┐
│ PROVIDING TO AT LEAST ONE APPLICATION HOSTED │  510
│ BY THE RADIO CONTROLLER, A RIC/RADIO    │
│ CONTROLLER CONTEXT ASSOCIATED WITH A STATE │
│ OF THE ONE OR MORE BASE STATIONS        │
└─────────────────────────────────────────┘
                    │
                    ▼
┌─────────────────────────────────────────┐
│ OBTAINING FROM THE AT LEAST ONE APPLICATION, A │  520
│ RIC/RADIO CONTROLLER POLICY TO BE SET, THE │
│ POLICY DEFINING A SET OF ONE OR MORE RULES, │
│ EACH RULE INCLUDING A CONDITION AND AN ACTION │
└─────────────────────────────────────────┘
                    │
                    ▼
┌─────────────────────────────────────────┐
│ DETECTING AN EVENT THAT MATCHES A CONDITION │  530
│ OF ONE OR MORE OF THE RULES OF THE RIC/RADIO │
│ CONTROLLER POLICY                       │
└─────────────────────────────────────────┘
                    │
                    ▼
┌─────────────────────────────────────────┐
│ APPLYING THE ACTION OF THE RULE ASSOCIATED │  540
│ WITH THE CONDITION TO WHICH THE EVENT MATCHES │
└─────────────────────────────────────────┘
```

FIG.5

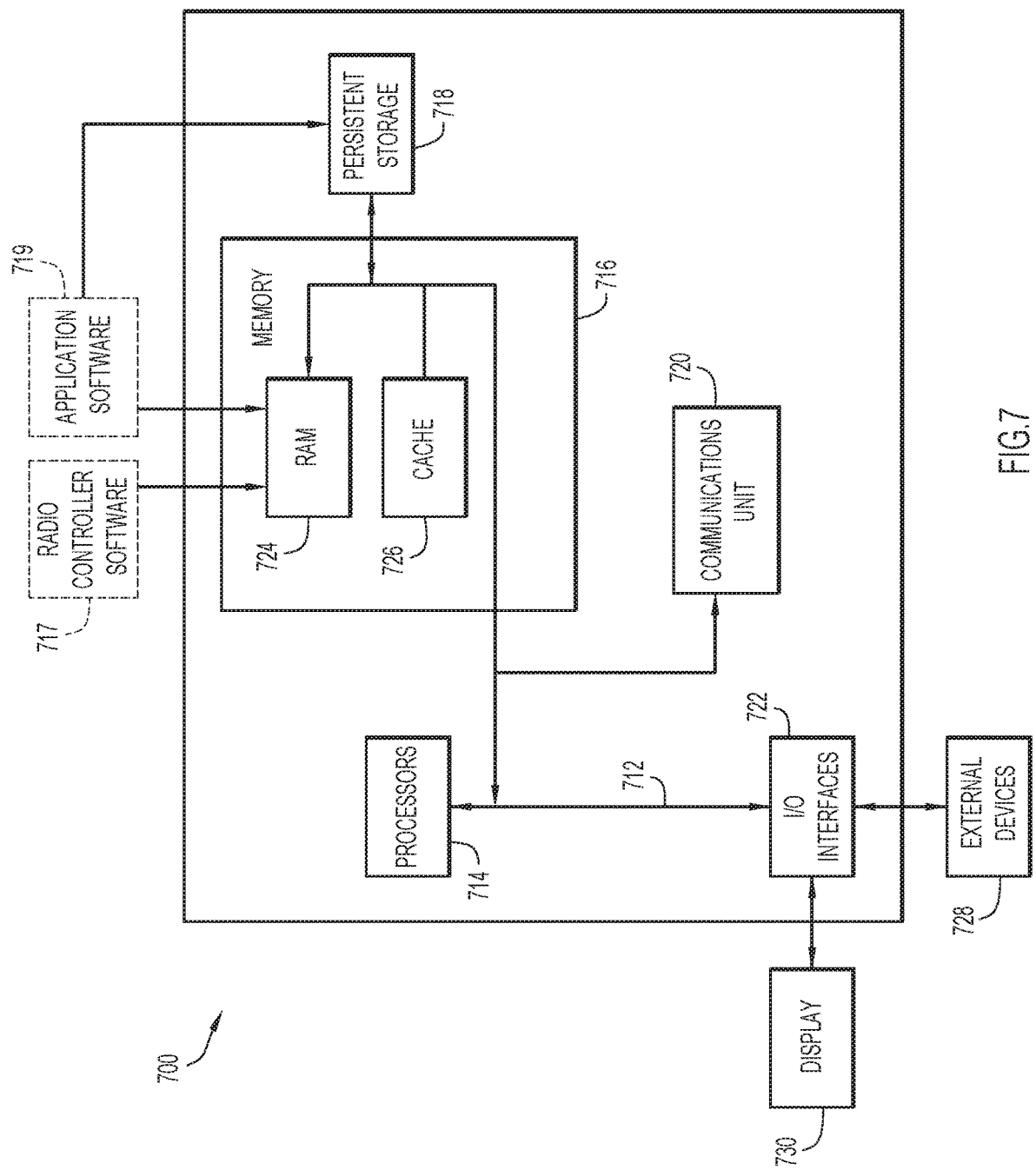

INTERACTION BETWEEN RADIO CONTROLLER PLATFORM AND THIRD PARTY APPLICATIONS

TECHNICAL FIELD

The present disclosure relates to mobile wireless network equipment and services.

BACKGROUND

Various aspects of a Cloud- (or Centralized) Radio Access Network (C-RAN) are under development in major standard bodies such as $3^{rd}$ Generation Partnership Project (3GPP) and in industry forums, such as the O-RAN Alliance. The O-RAN Alliance has suggested further disaggregation of components of a base station to separate out a Radio Intelligent Controller (RIC), sometimes referred to as Near-RT RIC or simply MC, which takes responsibility for Radio Resource Management (RRM) decisions of a base station.

BRIEF DESCRIPTION OF THE DRAWINGS

FIG. 5 is a flow chart depicting a method performed by the radio controller, according to an example embodiment.

FIG. 7 is a hardware block diagram of a computing device that may perform functions of the radio controller, in connection with the techniques depicted in FIGS. 1-6.

DESCRIPTION OF EXAMPLE EMBODIMENTS

Overview

Figure 1:
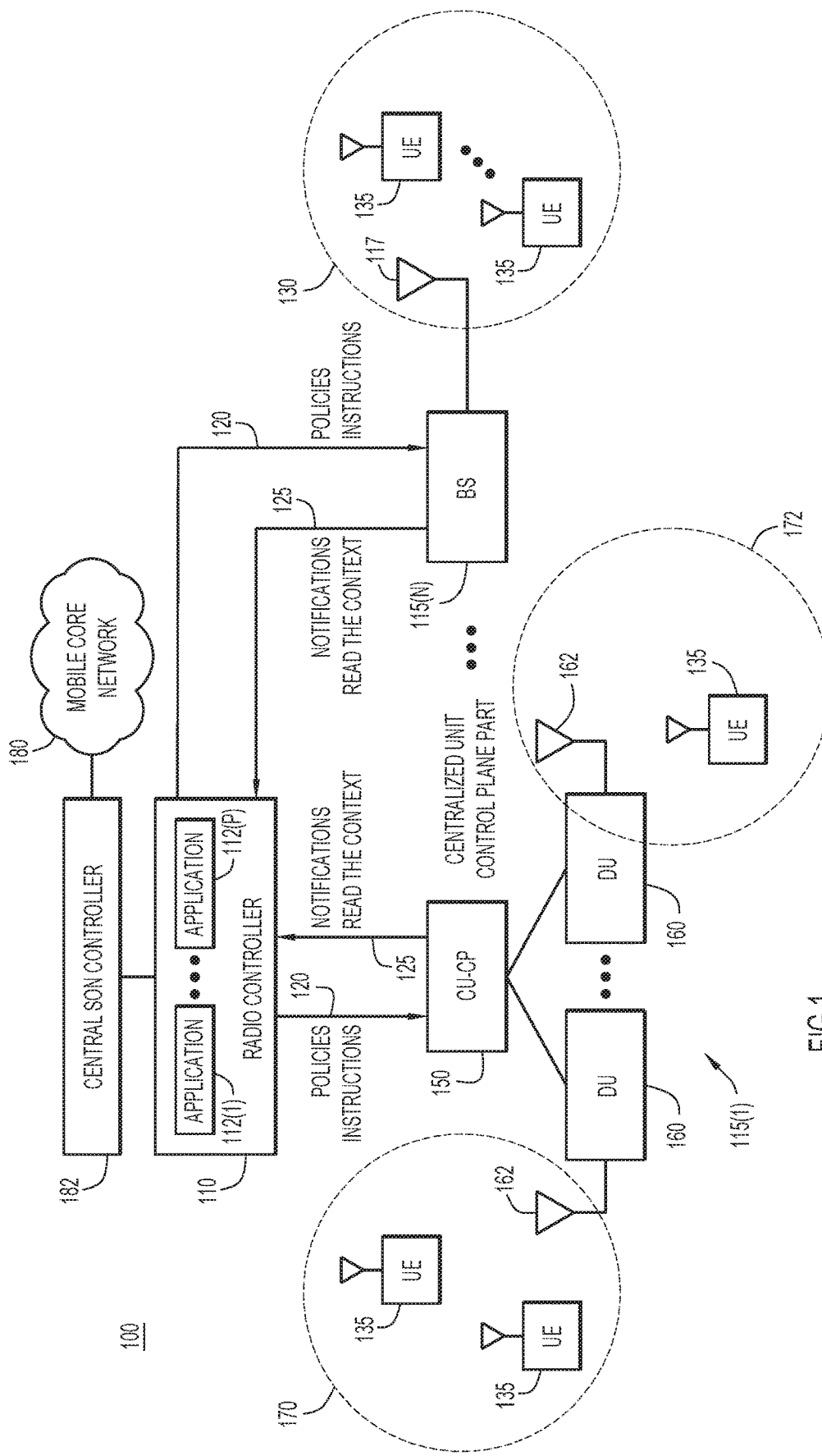
FIG. 1 is a block diagram of a system depicting a radio access network that includes a radio controller and one or more base stations, where the radio controller hosts one or more applications that interact with the radio controller for various radio access network operations, according to one example embodiment.

Briefly, in one embodiment, a method is provided that is performed by a radio controller that is in communication with one or more base stations serving wireless devices in a radio access network. The method includes the radio controller providing to at least one application hosted by the radio controller, a radio controller context associated with a state of the one or more base stations. The radio controller obtains from the at least one application, a radio controller policy to be set, the radio controller policy defining a set of one or more rules, each rule including a condition and an action. The radio controller detects an event that matches a condition of one or more of the rules of the radio controller policy. The radio controller applies the action of the rule associated with the condition to which the event matches. The event may be associated with a radio access network event.

In another embodiment, a method is provided that is performed by a first application hosted by a radio controller that is in communication with one or more base stations serving wireless devices in a radio access network. The first application obtains from the radio controller, a radio controller context associated with a state of the one or more base stations. The first application provides to the radio controller a radio controller policy to be set, the radio controller policy defining a set of one or more rules, each rule including a condition and an action. The radio controller policy enables the radio controller to detect an event that matches a condition of one or more of the rules of the radio controller policy, and apply the action of the rule associated with the condition to which the event matches.

Example Embodiments

Presented herein are systems and methods by which a radio controller, also called a radio intelligence controller (MC), is configured as a platform that hosts one or more third party applications. The radio controller platform provides the applications with access to radio access network (RAN) information and a command interface. The application(s) hosted by the radio controller may be developed by vendors that are different from the vendor of the radio controller platform or other elements in the RAN, and are also referred to here as "third party" applications.

In one example, as will be described in further detail below, the radio controller platform provides new opportunities to deploy an application, such as a Self-Organization Networking (SON) function, which is running in a central location different from local facilities where RAN software is running. The new opportunities are created by adding a local application hosted by the radio controller platform. A centralized application, such as SON function/controller, can provide for multi-domain network and service optimization. By "domain", it is meant RAN, mobile core network, transport network, fronthaul/backhaul, etc. The local application component (such as a local SON component) hosted by the RIC platform, on the other hand, has access to real-time RAN information down to the level of individual user equipment (UEs). This enables real-time optimization actions at the level of network nodes and individual UEs. This architecture employs a policy-based paradigm for an interface provided by the radio controller platform to an application, such as a SON application.

It is envisioned that the radio controller may be provided by one vendor, the base station(s) provided by another vendor(s), and the applications provided by still other vendors. This paradigm provides flexibility, especially if the radio controller functions are made open source.

As described in more detail below, an application programming interface is defined between the applications and the radio controller. The radio controller collects information from the RAN node and makes that information available to the applications. The applications also provide input information to the radio controller, such as in the form of a policy. The policy rules from the applications are executed by the radio controller.

Thus, one or more applications run inside the radio controller, and the radio controller could be controlling multiple base stations (monolithic or disaggregated). Policies set from the applications to the radio controller can be in terms of/impacting multiple base stations.

Referring first to FIG. 1, a diagram is shown of a system 100, according to an example embodiment. The system 100 includes a radio controller 110 that serves as a platform for a plurality of applications 112(1)-112(P). The radio controller 110 is in communication with a plurality of base stations (BS's) 115(1)-115(N). The radio controller 110 may take the form of a server or other computing entity remote from the BS's 115(1)-115(N). The radio controller 110 and the BS's 115(1)-115(N) form a radio access network.

As described further below, the base stations may be fourth generation (4G) base stations (eNBs) or fifth generation (5G) base stations (gNBs), and may take a form of a disaggregated base station, BS 115(1), or a monolithic base station, BS 115(N). In one form, the radio controller software may run on the same (computing) platform as that on which the base station software runs. In the embodiment of FIG. 1, the BS 115(N) includes hardware and/or software to perform baseband signal processing (such as modulation/demodulation) as well as hardware for signal transmission and signal reception via antenna 117.

The radio controller 110 can read RAN contexts from the BS's at any time and receive notifications as well. A RAN context is a set of variables holding a state of a RAN node, i.e., base station. For example, in the case of BS 115(N), the radio controller 110 provides RAN policies and/or instructions to the BS 115(N) as shown at 120, and receives notifications and reads RAN contexts from the BS 115(N), as shown at 125. Based on the notifications and RAN contexts, the radio controller 110 provides RAN policies and instructions to the BS 115(N). The BS 115(N) serves wireless communication in a corresponding cell 130 with wireless User Equipment (UEs) 135.

Similarly, the applications 112(1)-112(P) interact with the radio controller 110 using a policy-based process/mechanism that operates in terms of contexts and policies/rules. The applications 112(1)-112(P) running on the radio controller 110 may set one or more RIC/radio controller policies on the radio controller 110 and may read RIC/radio controller context from the radio controller 110. The RIC/radio controller context represents a state of the one or more base stations that is/are controlled by the radio controller.

One variation to a RAN architecture is to split the monolithic BS into components that can be developed by different vendors. To this end, the BS 115(1) is a disaggregated base station system that includes a Centralized Unit Control Plane (CU-CP) component 150 and one or more distributed units (DUs) 160. The radio controller 110 can control one or more CU-CPs 150. Each CU-CP 150 can in turn control one or more DUs 160. It should be understood that the disaggregated base station also includes a Central Unit-User Plane (CU-UP) component, which is not shown because the CU-UP does not have a role in connection with the techniques presented herein.

Each DU 160 includes an antenna assembly 162 as well as the transmitter and receiver hardware to enable wireless radio frequency communication via antennas 162 with UEs 135. Each DU 160 serves wireless communication in its own cell or a DU 160 may serve multiple cells. In one example, one DU 160 serves wireless communication in a first cell 170 and another DU 160 serves wireless communication in a second cell 172.

The CU-CP 150 provides notifications and RAN contexts to the radio controller 110, at 120. The radio controller 110 provides RAN policies and instructions based on the notifications and contexts to the CU-CP 150, at 125.

The CU-CP 150 holds the RAN contexts for all UEs serviced by the DU(s) 160, including the states of the corresponding state machines, such as handover (HO) states of individual UE, and also the RAN contexts associated with groups of UEs, such as status of the packet queues or load indicators. The CU-CP 150 executes RAN policies set by the radio controller 110, such as a policy for handover decisions.

As used herein, a policy is a set of rules, with every rule including a condition and an associated action. The condition may be expressed in terms of the context held by the radio controller 110. The events to be processed according to the policies may result from changes in the contexts, e.g., the change in the RIC/radio controller context resulted from arrival of the report on the radio signal measurements performed by the UE. The condition may be, for example, a threshold crossing of a signal measurement. An example of a RIC action is instructing the RAN to trigger a handover.

The RAN policy may include a special action of the CU-CP 150 to query the radio controller 110 for instructions. For example, for a certain category of UEs, the query can be a query for instructions whether the HO should be started and to which neighbor cell.

The radio controller 110 has read-only access to the RAN contexts for UEs serviced by in the system 100. The radio controller 110 sets the RAN policies executed by the CU-CP 150, and responds to the queries generated by the CU-CP 150.

The BS's 115(1)-115(N) may include any number of BS's and combinations of monolithic BS's and disaggregated BS's.

The radio controller 110 and/or certain applications(s) hosted by the radio controller 110, may be in communication with a mobile core network 180 that includes a variety of management functions and entities, as is known in the art. A central SON controller 182 may also have communication with the radio controller 110. The central SON controller 182 is an example of an entity that is external to the radio access network. The radio controller 110 may provide information about the radio access network to the entity, e.g., central SON controller 182, and one or more of the applications 112(1)-112(N) running on the radio controller 110 may obtain commands from the entity, e.g., the central SON controller 182. In one form, the central SON controller 182 runs one or more central SON applications, each SON application configured to execute a respective optimization target function or functions for one of more of the radio access network, the mobile core network 180, and a transport network (backhaul and fronthaul communication links between the radio controller 110 and the BS's 115(1)-115(N)).

One of the applications 112(1)-112(N) running on the radio controller 110 may include a (local) SON application, such as Automatic Neighbor Relations, load balancing, interference mitigation etc. For example, if there is a need to steer the traffic from a first cell (e.g., cell 170) to a second cell (e.g., cell 172) for the purposes of load balancing, the application will take this need into account when setting the HO policy (a RIC/radio controller policy) or responding to the HO related queries from a base station.

The radio controller 110 can make real-time decisions on certain actions to be performed on the individual UEs or the categories of UEs. These decisions include, for example:

Admitting the UE to the cell;

Admitting establishment/modification of the Radio Bearer (PDU connections, QoS Flows) towards the UE;

Executing HO on the UE;

Applying a certain multiple-input multiple-output (MIMO) transmission mode to the UE;

and

Associating the UE with a certain network slice instance.

The radio controller 110, CU-CP 150 and DUs 160 can be separate products and from different vendors. In such a scenario, procedures of communication between the component and its peer would be described in the specifications supplied by the vendor.

The communication between the radio controller 110 and a given BS may be by way of a software Application Programming Interface (API) in the situation where the CU-CP 150 and the radio controller 110 run on the same computing platform, or by way of a wired network or some other suitable communication interface.

Figure 2:
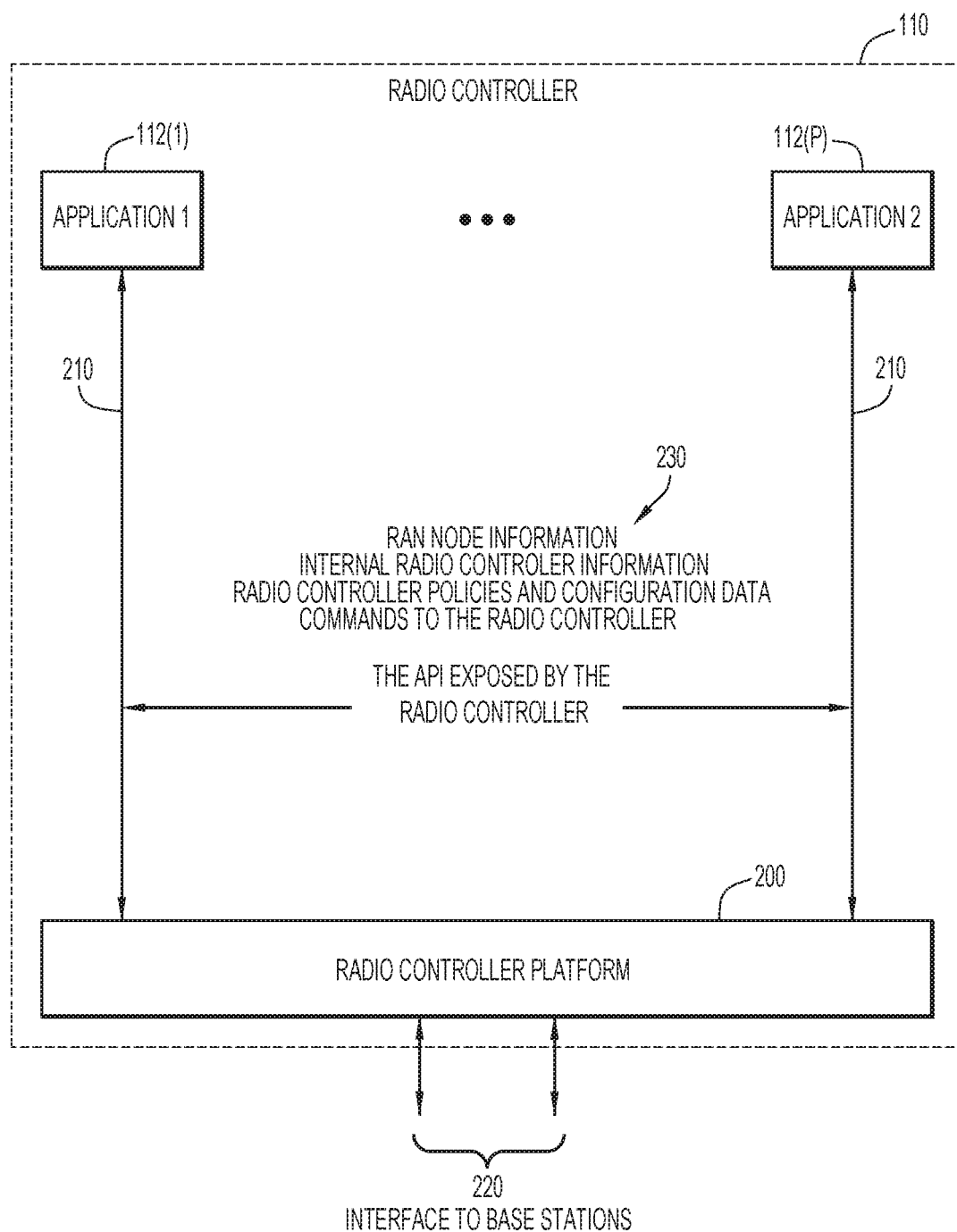
FIG. 2 is a functional block diagram of the radio controller hosting one or more applications and exposing an application programming interface to the one or more applications, according to an example embodiment.

Turning now to FIG. 2, a diagram is shown of the radio controller 110 and applications 112(1)-112(P) in more detail. The radio controller 110 includes a radio controller platform 200 that exposes an Application Programming Interface (API) 210 to the applications 112(1)-112(P). The radio controller platform 200 also provides an interface 220 to one or more base stations 115(1)-115(N) (not shown in FIG. 2). The radio controller platform 200 may take the form of a computing device that is enabled to host the applications 112(1)-112(P). Thus, the radio controller platform 200 provides to the applications 112(1)-112(P), via the API 210, services provided by central processing unit (CPU) resources, memory, storage resources. The radio controller platform 200 may further include other resources, such as communication interfaces, a display/screen, etc., access to which is controlled via an operating system running on the radio controller platform 200.

The API 210 provides, to the applications 112(1)-112(P), access to a variety of information maintained by the radio controller 110 or obtained by the radio controller 110 from one or more base stations. Such information, shown at 230, may include RAN node information, internal radio controller information, radio controller polices and configuration data, and commands to the radio controller.

Figure 3:
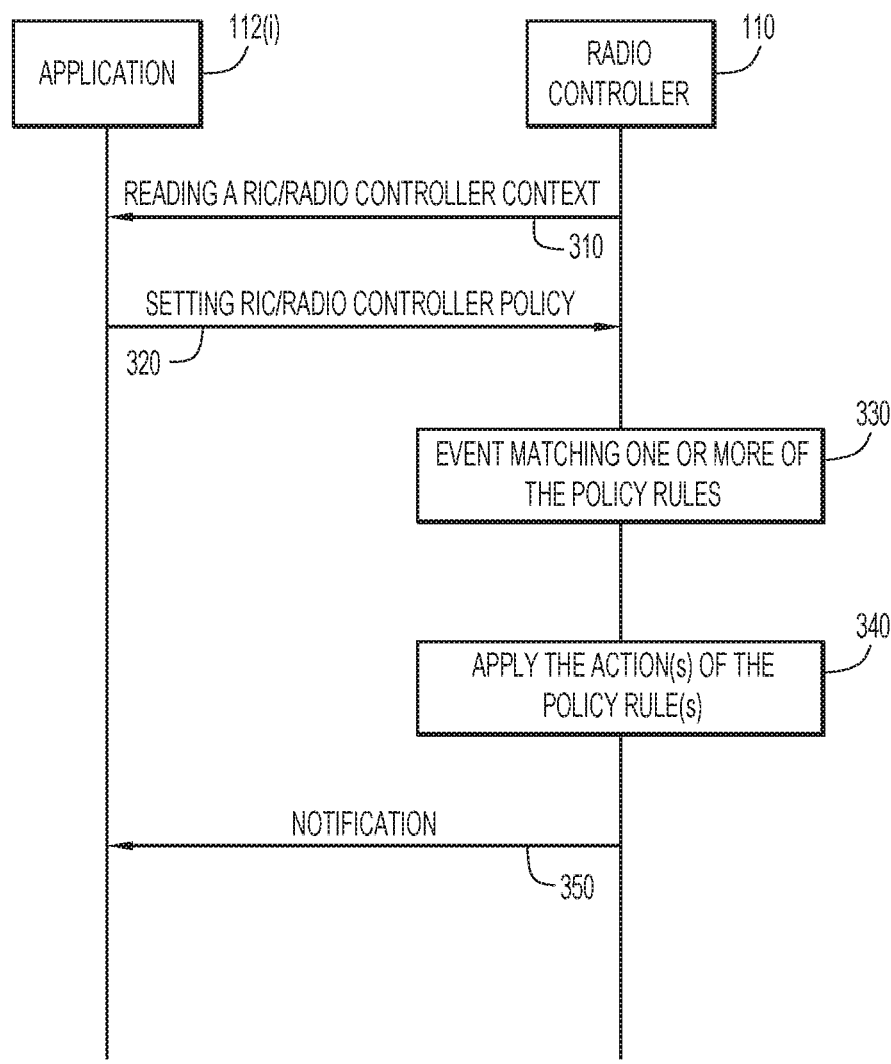
FIG. 3 is a sequence diagram between the radio controller and an application hosted by the radio controller, according to an example embodiment.

Reference is now made to FIG. 3. FIG. 3 shows a process 300 depicting a scenario involving interaction between an arbitrary application, e.g., application 112(i), and the radio controller 110. At 310, the application 112(i) reads a RIC/radio controller context from the radio controller 110. The RIC/radio controller context may take the form of a set of variables holding the state(s) of the RAN node (one or more base stations). At 320, the application 112(i) sets a RIC/radio controller policy for the radio controller 110. It should be understood that operation 310 may occur at any time, and not necessarily before operation 320. The RIC/radio controller policy defines a set of one or more rules, and each rule includes a condition and an action.

A policy consists of rules. A rule consists of:
Condition: if ( . . . )
Action: do . . .

At 330, the radio controller 110 detects occurrence of a RIC/radio controller event (which may be caused by a RAN event or a change in the RIC/radio controller context) that matches one or more of the RIC/radio controller policy rules. A RIC/radio controller event can be generated for example when the RIC/radio controller context is changed. At 340, the radio controller 110 applies an action(s) of the RIC/radio controller policy rule(s) determined to correspond or match to the detected event. At 350, the radio controller 110 may provide to the application 112(1) a notification indicating the occurrence of the event and application of one or more actions according to the RIC/radio controller policy for that event.

The radio controller 110 may interact with one or more base stations using any suitable mechanism. Once such mechanism may employ a paradigm similar to the interaction between the application 112(i) and the radio controller 110, where the radio controller reads a context from a given base station, and sets a policy (also consisting of one or more rules that each define a Condition and an Action) to the given base station. The base station then may detect occurrence of an event that matches one or more of the policy rules, and apply the appropriate action of the matching policy rule(s). The context, policy (and associated conditions and actions of the rules) for the interactions between the radio controller 110 and the base station(s) are different from those between the application(s) 112(1)-112(P) and the radio controller 110.

The following is an example use case. Traffic addressed to a certain category of the users is steered, from a cell C1 to a cell C2 under the base station(s) controlled by the radio controller 110. For example, the category of users may be non-cellular Internet of Things (non-IoT) users. The context includes recent measurements of the following in both cells C1 and C2:

Radio signal measurements for all connected UEs
Load created by the IoT UEs
Load created by the non-IoT UEs
etc.

One example for a RIC/radio controller policy for this use case may be:

The RIC/radio controller context=the set of recent Radio signal measurements for all connected UEs and cells load indicators as described above.

The Rule: IF (UE is NOT cIoT AND $RSRP_{UE,C1}<X$ AND $RSRP_{UE,C2}>Y$) DO (Start HO of the UE from C1 to C2), where X and Y are configurable parameters.

The Rule triggers HO of the UE from cell C1 to cell C2 in the case when:
it is not an IoT device;
the signal from C1 reported by the UE, is lower than the threshold X; and
the signal from C2 reported by the UE, is higher than the threshold Y.

In this use case example, it is assumed that the measurements configuration provided by the base station to the connected UEs triggers the measurement reports when the signal is crossing the thresholds X and Y.

In general, the condition of a rule may include any parameter(s) that belongs to the context, such as all kind of measurements defined in the 3GPP standard, UE location and/or velocity measured by the base station, etc. The condition may also include RAN enrichment information results. For example, the thresholds X and Y may be derived from the long-term statistics and/or machine-learning output.

While FIG. 3 shows that the radio controller 110 applies the action when an event is detected that matches one or more of the RIC/radio controller policy rules, there is a variation to this flow in which the action of the rule is that the radio controller 110 calls the application 112(i) (which can be the same application that sets the policy or another application). The call to the application is to query for an instruction to be executed by the radio controller 110. This variation enables the application(s) to respond in real-time to the changing situation by being notified about a matching event and providing an instruction to the radio controller 110 as to how to react to that event, at that time.

Still another variation is for the action of the rule to call the application 112(i) and the application 112(i) is configured to specify interaction between the application 112(i) and an external entity, such as the centralized SON controller 182 shown in FIG. 1. The API 210 (FIG. 2) provided by the radio controller 110 can thus allow for establishing a communication channel between the application 112(i) and an external entity. This communication channel maybe initiated by either side (external function or application) and/or combined with mutual discovery.

Further still, such communication with an external entity may enable a combined SON solution capable of multi-domain optimization of the network, where the "domains" may include the RAN, the core network, the transport network (backhaul or fronthaul), facilities that control Network Function Virtualization (NFV) and possibly others. The combined SON solution may target end-to-end service quality optimization and/or network slice level optimization.

There are still further variations envisioned. For example, actions requested/specified by a policy may include modification of configuration parameters of the radio controller 110 and/or of the CU-CP 150. For example, the radio controller 110 may hold a default (baseline) set of base station configuration (OAM) parameters that are applied to all controlled base stations until the radio controller 110 decides to modify some of those parameters. This baseline set can be exposed by the radio controller 110 to the applications running on the radio controller via the API 210. In another example, the policy can be modified by the application. There may be certain categories of modifications of the RIC/radio controller policy that can be achieved without re-installing the policy. For example, the modification of numerical policy parameters (such as a threshold in the policy rule condition). On the other hand, other categories of modifications of the policy may involve re-installation of the policy. Further still, modification of the policy can be driven by an outcome of an algorithm (such as a machine learning algorithm) operating on information received from the radio controller and/or from the one or more base stations.

Further examples of Conditions include:

Category of the UE e.g. "UE is IoT" or "UE is not IoT" (IoT=Internet of Things);

UE location e.g., "UE is located within a particular rectangular area (or within a cell, Tracking Area, etc.)";

UE speed/velocity e.g. "the UE speed is less than [some threshold]";

Network Slice Instance (NSI) to which the UE belongs e.g., "the UE belongs to the NSI of the Type N" or "the UE belongs to the NSI with ID=K"; and Measurements/statistics generated by the base station e.g., load (single value or historical series) in certain cells served by the base station.

Further examples of actions may include:

RIC to modify the Operations, Administration and Management (OAM) parameters in the base station (some OAM parameters can be changed by the base station after they are set by the management system, such as the list of neighbor base stations);

RIC to issue a command to modify the internal (non-OAM) base station parameters that control the behavior of the base station (e.g., scheduling parameters, admission control parameters, etc.);

RIC to issue a command to the base station, triggering UE state transition e.g. from the INACTIVE to IDLE state;

RIC to issue a command to the base station, triggering certain procedures which include sending the corresponding messages over the base station signaling interfaces (e.g., S1, X2, NG, Xn) or base station management interfaces;

RIC to issue a command to the base station, triggering certain measurement procedures (e.g. trace type procedures in the base station and/or in the UE or a group/category of the UEs);

RIC to issue a command to the base station, turning on/off one of cells served by the base station (e.g., for power saving); and MC to issue a command to the base station, adding/modifying/deleting one or more of the cells (with or without invocation of beamforming control).

Figure 4:
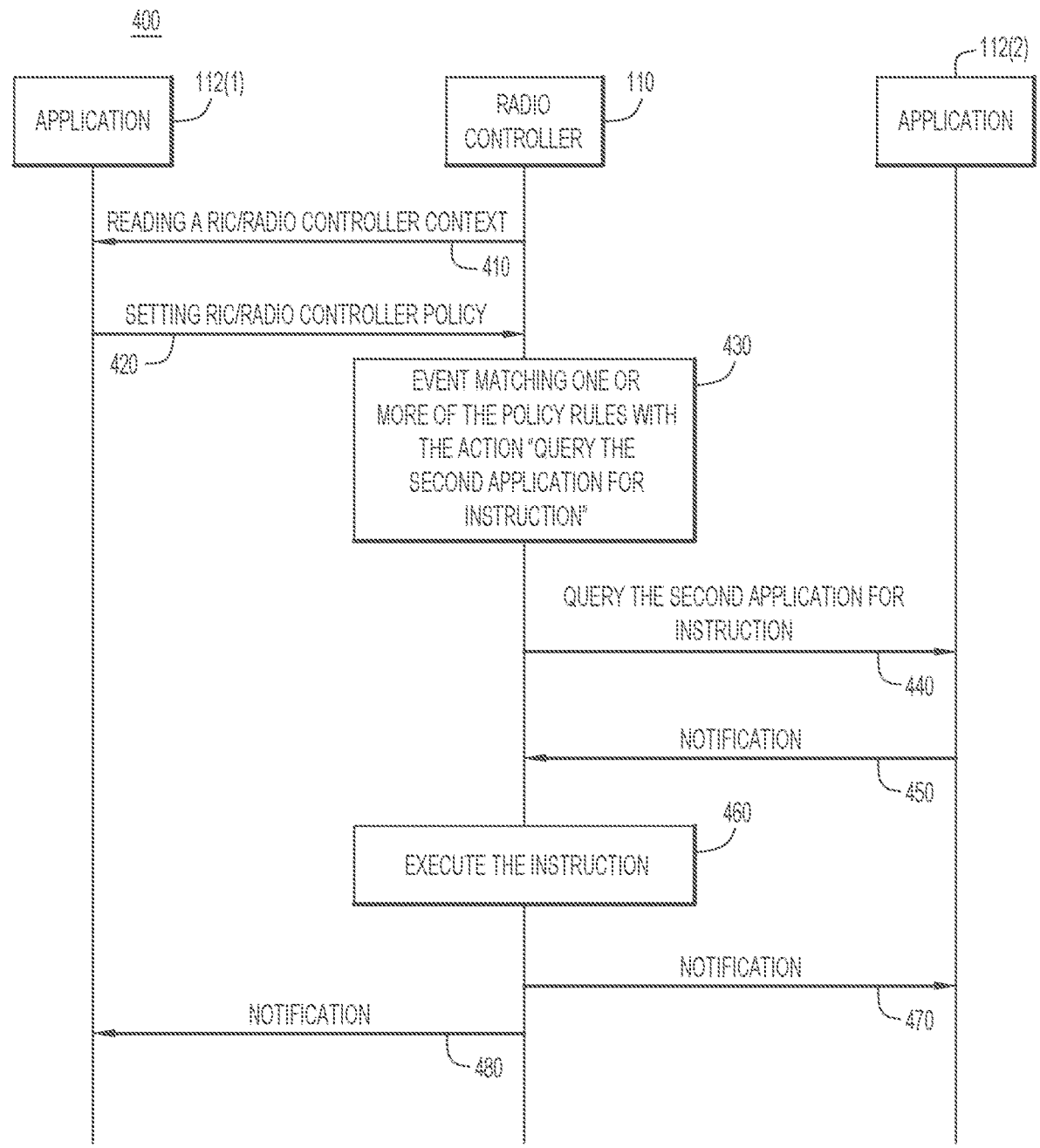
FIG. 4 is a sequence diagram between the radio controller and two applications hosted by the radio controller, according to another example embodiment.

Turning now to FIG. 4, a process 400 is shown that involves an example embodiment in which multiple applications hosted by the radio controller 110. In the process 400, a first application 112(1) and a second application 112(1) are hosted by the radio controller 110.

At 410, the first application 112(1) reads the RIC/radio controller context from the radio controller 110. The application 112(1) may read the RIC/radio controller context at any time, not necessarily before operation 420. At 420, the first application 112(1) sets the RIC/radio controller policy on the radio controller 110. At 430, the radio controller 110 detects an event (an internal RIC event or an event caused by a RAN event) that matches one or more of the policy rules that has the Action "query the second application for instruction." Thus, at 440, the radio controller 110 queries the second application 112(2) for instruction. At 450, the second application 112(2) provides the instruction(s) to the radio controller 110. At 460, the radio controller 110 executes the instruction (such as through interactions with one or more base stations). At 470, the radio controller 110 sends to the second application 112(2) a notification indicating that the instruction, provided by application 112(2), has been executed. At 480, the radio controller 110 sends to the first application 112(1) a notification indicating that the Action for the policy provided by application 112(1), has been executed.

Reference is now made to FIG. 5. FIG. 5 shows a flow chart of a method 500 according to an example embodiment. The method 500 is performed by radio controller that is in communication with one or more base stations serving wireless devices in a radio access network. The one or more base stations may comprise one or more monolithic base stations and/or one or more disaggregated base stations each having a centralized control plane entity. The method 500 includes, at 510, providing to at least one application hosted by the radio controller, a RIC/radio controller context associated with a state of the one or more base stations. At 520, the radio controller obtains from the at least one application a RIC/radio controller policy to be set. As explained above, providing the RIC/radio controller context can occur at any time, not necessarily before the RIC/radio controller policy is obtained. The RIC/radio controller policy defines a set of one or more rules, each rule including a condition and an action. As explained above, the condition of the one or more rules may be defined in terms of the RIC/radio controller context obtained from the at least one application.

At 530, the radio controller detects an event that matches a condition of one or more of the rules of the radio controller policy. At 540, the radio controller applies the action of the rule associated with the condition to which the event matches. The event that the radio controller detects may be caused by a RAN event or may be caused by a change in the radio controller context.

In one embodiment as depicted in FIG. 4, the providing operation 510 includes providing the radio controller context to a first application hosted by the radio controller, and the obtaining operation 520 comprises obtaining the radio controller policy from the first application. Further, the applying operation 540 may include: providing a query to a second application hosted by the radio controller, the query requesting an instruction from the second application; obtaining the instruction from the second application; and executing the instruction on the radio controller. In one example, the second application is identical to the first application, and in another example, the second application is different from the first application.

In one embodiment, the applying operation 540 may include modifying one or more configuration parameters of the radio controller.

Again, the one or more base stations may comprise one or more monolithic base stations and/or one or more disaggregated base stations each having a centralized component. Thus, there can be 2-split base station that consists of a centralized unit/component and one or more distributed units, and 3-split base station that consists of a centralized unit control plane component, a centralized unit user plane component, and one or more distributed units.

Figure 6:
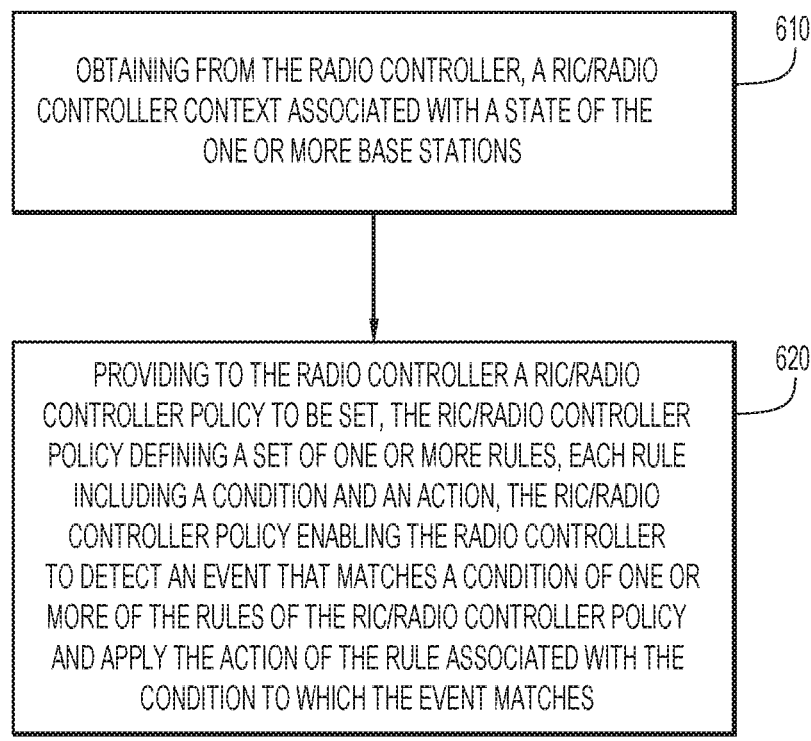
FIG. 6 is a flow chart depicting a method performed by an application hosted by the radio controller, according to an example embodiment.

Reference is now made to FIG. 6. FIG. 6 shows a flow chart of a method 600 according to an example embodiment. The method 600 is performed by an application, e.g., an arbitrary first application, hosted by a radio controller that is in communication with one or more base stations serving wireless devices in a radio access network. The method 600 includes, at 610, obtaining from the radio controller, a radio controller context associated with a state of the one or more base stations. At 620, the method includes providing to the radio controller a radio controller policy to be set, the radio controller policy defining a set of one or more rules, each rule including a condition and an action. As explained above, the reading/obtaining of the radio controller context can occur at any time, and need not occur before the radio controller policy is provided by the application to the radio controller. The radio controller policy enables the radio controller detect an event that matches a condition of one or more of the rules of the radio controller policy and apply the action of the rule associated with the condition to which the event matches. The event detected by the radio controller may be an event caused by a radio access network event or may be caused by a change in the radio controller context.

In one example embodiment, the action causes the radio controller to provide to the first application hosted by the radio controller, a query requesting from the first application an instruction to be executed by the radio controller. In another example embodiment, the action causes the radio controller provide to a second application hosted by the radio controller, a query requesting from the second application an instruction to be executed by the radio controller.

In still another example embodiment, the action includes the radio controller causing the first application to communicate with an entity that is external to the radio access network. The method 600 may further include providing information about the radio access network; and obtaining at the first application, commands from the entity. Thus, the external entity receives information about the radio access network, such as network performance indicators. The external entity may send commands to an application hosted by the radio controller. In one form, as shown in FIG. 1, the external entity is a central SON controller 182 that includes one or more SON applications, where each SON application is configured to execute a respective optimization target function or functions for one of more of the radio access network, a mobile core network, and a transport network.

In one example embodiment, the method 600 may further include the first application modifying the radio controller policy to produce a modified radio controller policy. The radio controller policy may be modified with or without re-installing the modified radio controller policy on the radio controller. In still another example, the radio controller policy is modified based on an outcome of an algorithm operating on information received from the radio controller and/or from the one or more base stations and/or from the external entity such as central SON controller 182. The algorithm, which may include machine learning, may be running on the radio controller, in an application hosted by the radio controller, or in an external entity, such as the central SON controller 182.

FIG. 7 illustrates a hardware block diagram of a computing device 700 that may perform the functions of any of the radio controller 110. It should be appreciated that FIG. 7 provides only an illustration of one embodiment and does not imply any limitations with regard to the environments in which different embodiments may be implemented. Many modifications to the depicted environment may be made.

As depicted, the device 700 includes a bus 712, which provides communications between computer processor(s) 714, memory 716, persistent storage 718, communications unit 720, and input/output (I/O) interface(s) 722. Bus 712 can be implemented with any architecture designed for passing data and/or control information between processors (such as microprocessors, communications and network processors, etc.), system memory, peripheral devices, and any other hardware components within a system. For example, bus 712 can be implemented with one or more buses.

Memory 716 and persistent storage 718 are computer readable storage media. In the depicted embodiment, memory 716 includes random access memory (RAM) 724 and cache memory 726. In general, memory 716 can include any suitable volatile or non-volatile computer readable storage media. Instructions for the radio controller software 717 that controls and performs operations of the radio controller 110 as well as and application software 719 for the one or more applications hosted by the radio controller 110, may be stored in memory 716 or persistent storage 718 for execution by processor(s) 714. When the processor(s) 714 execute the radio controller logic, the processor(s) 714 are caused to perform the radio controller operations described above in connection with FIGS. 1-6.

One or more programs may be stored in persistent storage 718 for execution by one or more of the respective computer processors 714 via one or more memories of memory 716. The persistent storage 718 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 718 may also be removable. For example, a removable hard drive may be used for persistent storage 718. Other examples include optical and magnetic disks, thumb drives, and smart cards that are inserted into a drive for transfer onto another computer readable storage medium that is also part of persistent storage 718.

Communications unit 720, in these examples, provides for communications with other data processing systems or devices. In these examples, communications unit 720 includes one or more network interface cards. Communications unit 720 may provide communications through the use of either or both physical and wireless communications links.

I/O interface(s) 722 allows for input and output of data with other devices that may be connected to computer device 700. For example, I/O interface 722 may provide a connection to external devices 728 such as a keyboard, keypad, a touch screen, and/or some other suitable input device. External devices 728 can also include portable computer readable storage media such as database systems, thumb drives, portable optical or magnetic disks, and memory cards.

Software and data used to practice embodiments can be stored on such portable computer readable storage media and can be loaded onto persistent storage 718 via I/O interface(s) 722. I/O interface(s) 722 may also connect to a display 730. Display 730 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, according to one aspect, a method is provided that is performed by a radio controller that is in communication with one or more base stations serving wireless devices in a radio access network. The method includes: providing to at least one application hosted by the radio controller, a radio controller context associated with a state of the one or more base stations; obtaining from the at least one application, a radio controller policy to be set, the radio controller policy defining a set of one or more rules, each rule including a condition and an action; detecting an event that matches a condition of one or more of the rules of the radio controller policy; and applying the action of the rule associated with the condition to which the event matches.

According to another aspect, an apparatus is provided comprising a communication interface configured to enable communications with one or more base stations serving wireless devices in a radio access network; a memory; and at least one processor configured to perform operations including: providing to at least one application hosted by the radio controller, a radio controller context associated with a state of the one or more base stations; obtaining from the at least one application, a radio controller policy to be set, the radio controller policy defining a set of one or more rules, each rule including a condition and an action; detecting an event that matches a condition of one or more of the rules of the radio controller policy; and applying the action of the rule associated with the condition to which the event matches.

According to yet another aspect, one or more non-transitory computer readable storage media encoded with software instructions that, when executed by a processor of a radio controller that is in communication with one or more base stations serving wireless devices in a radio access network, cause the processor to perform operations including: providing to at least one application hosted by the radio controller, a radio controller context associated with a state of the one or more base stations; obtaining from the at least one application, a radio controller policy to be set, the radio controller policy defining a set of one or more rules, each rule including a condition and an action; detecting an event that matches a condition of one or more of the rules of the radio controller policy; and applying the action of the rule associated with the condition to which the event matches.

According to still another aspect, a method is provided that is performed by a first application hosted by a radio controller that is in communication with one or more base stations serving wireless devices in a radio access network. The method includes: obtaining from the radio controller, a radio controller context associated with a state of the one or more base stations; and providing to the radio controller a radio controller policy to be set, the radio controller policy defining a set of one or more rules, each rule including a condition and an action, the radio controller policy enabling the radio controller to detect an event that matches a condition of one or more of the rules of the radio controller policy and apply the action of the rule associated with the condition to which the event matches.

According to still another aspect, an apparatus is provided comprising a communication interface configured to enable communications between a radio controller and one or more base stations serving wireless devices in a radio access network; a memory including software instructions for a first application; and at least one processor configured to perform operations including: obtaining from the radio controller, a radio controller context associated with a state of the one or more base stations; and providing to the radio controller a radio controller policy to be set, the radio controller policy defining a set of one or more rules, each rule including a condition and an action, the radio controller policy enabling the radio controller to detect an event that matches a condition of one or more of the rules of the radio controller policy and apply the action of the rule associated with the condition to which the event matches.

According to yet another aspect, one or more non-transitory computer readable storage media are provided encoded with software instructions that, when executed by a processor of a radio controller that hosts a first application and that is in communication with one or more base stations serving wireless devices in a radio access network, cause the processor to perform operations including: obtaining from the radio controller, a radio controller context associated with a state of the one or more base stations; and providing to the radio controller a radio controller policy to be set, the radio controller policy defining a set of one or more rules, each rule including a condition and an action, the radio controller policy enabling the radio controller to detect an event that matches a condition of one or more of the rules of the radio controller policy and apply the action of the rule associated with the condition to which the event matches.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   at a radio controller that is in communication with a network controller and one or more base stations serving wireless devices in a radio access network:
   providing, to the network controller, information associated with the radio access network;
   providing to at least one application hosted by the radio controller, a radio controller context associated with a state of the one or more base stations, the at least one application including a Self-Organization Networking (SON) function that receives real-time information associated with the one or more base stations and the wireless devices;
   providing an interface that allows for establishing a communication channel between the at least one application and the network controller;
   obtaining from the at least one application, a radio controller policy to be set, the radio controller policy defining a set of one or more rules, each rule including a condition and an action to perform with respect to the one or more base stations when the condition occurs, a first action of the actions including causing the at least one application to obtain commands from the network controller, and a second action of the actions including querying the at least one application for an instruction for the radio controller to execute based on real-time information associated with the radio access network;
   detecting an event that matches a condition of one or more of the rules of the radio controller policy; and
   applying the action of the rule associated with the condition to which the event matches.

2. The method of claim 1, wherein providing the radio controller context comprises providing the radio controller context to a first application hosted by the radio controller, and wherein obtaining comprises obtaining the radio controller policy from the first application, and wherein applying the action includes:
  providing a query to a second application hosted by the radio controller, the query requesting an instruction from the second application;
  obtaining the instruction from the second application; and
  executing the instruction on the radio controller.

3. The method of claim 1, wherein the condition of the one or more rules includes one or more parameters associated with the radio controller context provided to the at least one application.

4. The method of claim 1, wherein the applying the action includes modifying one or more configuration parameters of the radio controller.

5. The method of claim 1, wherein the one or more base stations include a plurality of base stations that comprise a combination of one or more monolithic base stations and one or more disaggregated base stations.

6. The method of claim 1, wherein the event is caused by a radio access network event.

7. The method of claim 1, wherein the event is caused by a change in the radio controller context.

8. A method comprising:
  at a first application hosted by a radio controller that is in communication with a network controller and one or more base stations serving wireless devices in a radio access network:
  obtaining from the radio controller, a radio controller context associated with a state of the one or more base stations; and
  providing to the radio controller a radio controller policy to be set, the radio controller policy defining a set of one or more rules, each rule including a condition and a corresponding action to perform with respect to the one or more base stations when an event that matches the condition occurs, a first action including causing the first application to obtain commands from the network controller, and a second action including querying a second application hosted by the radio controller for an instruction for the radio controller to execute based on real-time information associated with the radio access network, the real-time information being accessed by the second application.

9. The method of claim 8, wherein the event is caused by a radio access network event or by a change in the radio controller context.

10. The method of claim 8, wherein a particular action causes the radio controller to provide to the first application hosted by the radio controller, a query requesting from the first application an instruction to be executed by the radio controller.

11. The method of claim 8, wherein a particular action causes the radio controller to provide to the second application hosted by the radio controller, a query requesting from the second application an instruction to be executed by the radio controller.

12. The method of claim 8, wherein a particular action includes the radio controller causing the first application to communicate with an entity that is external to the radio access network.

13. The method of claim 12, further comprising:
  providing information about the radio access network to the entity; and
  obtaining at the first application, commands from the entity.

14. The method of claim 8, wherein the network controller includes one or more self-organizing network (SON) applications, each SON application configured to execute a respective optimization target function or functions for one of more of the radio access network, a mobile core network, and a transport network.

15. The method of claim 8, further comprising:
  the first application modifying the radio controller policy to produce a modified radio controller policy.

16. The method of claim 15, further comprising:
  re-installing the modified radio controller policy on the radio controller.

17. The method of claim 15, further comprising:
  the first application modifying the radio controller policy without re-installing the radio controller policy on the radio controller.

18. The method of claim 15, wherein the modifying the radio controller policy is based on an outcome of an algorithm operating on information received from the radio controller and/or from the one or more base stations.

19. The method of claim 18, wherein the algorithm is a machine learning algorithm.

20. One or more non-transitory computer readable storage media encoded with software instructions that, when executed by a processor of a radio controller that hosts a first application and that is in communication with a network controller and one or more base stations serving wireless devices in a radio access network, cause the processor to perform operations including:
  obtaining from the radio controller, a radio controller context associated with a state of the one or more base stations; and
  providing to the radio controller a radio controller policy to be set, the radio controller policy defining a set of one or more rules, each rule including a condition and a corresponding action to perform with respect to the one or more base stations when the condition occurs, a first action including causing the first application to obtain commands from the network controller, and a second action including querying a second application hosted by the radio controller for an instruction for the radio controller to execute, the instruction being based on real-time information associated with the radio access network, the real-time information being accessed by the second application, the radio controller policy enabling the radio controller to detect an event that matches a condition of one or more of the rules of the radio controller policy and apply the action of the rule associated with the condition to which the event matches.

21. The non-transitory computer readable storage media of claim 20, wherein the action causes the radio controller to perform one or more of:
  providing to the first application hosted by the radio controller, a query requesting from the first application an instruction to be executed by the radio controller; or
  providing to a second application hosted by the radio controller, a query requesting from the second application an instruction to be executed by the radio controller.

22. The method of claim 1, wherein the network controller includes one or more self-organizing network (SON) applications, each SON application configured to execute a respective optimization target function or functions for one of more of the radio access network, a mobile core network, and a transport network.

23. The non-transitory computer readable storage media of claim 20, wherein the network controller includes one or more self-organizing network (SON) applications, each SON application configured to execute a respective optimization target function or functions for one of more of the radio access network, a mobile core network, and a transport network.

* * * * *